United States Patent [19]

Bergsma

[11] Patent Number: 4,753,262
[45] Date of Patent: Jun. 28, 1988

[54] FUEL SYSTEM VENT VALVE HAVING ROLL-OVER CLOSURE WITH IMPROVED RE-OPENING ACTION FOR VENTING

[75] Inventor: Rudolph Bergsma, Ann Arbor, Mich.

[73] Assignee: G.T. Products, Inc., Ann Arbor, Mich.

[21] Appl. No.: 11,834

[22] Filed: Feb. 6, 1987

[51] Int. Cl.[4] .................................... F16K 17/36
[52] U.S. Cl. .................................... 137/39; 137/43; 251/77; 251/84
[58] Field of Search .................... 137/43, 39; 251/77, 251/84

[56] References Cited

U.S. PATENT DOCUMENTS

| | | | |
|---|---|---|---|
| 2,069,069 | 1/1937 | Horton | 251/77 |
| 3,549,119 | 12/1970 | Sellers | 251/84 |
| 3,905,689 | 9/1975 | Mylander | 251/77 |
| 3,910,302 | 10/1975 | Sudhir | 137/43 |

Primary Examiner—Robert G. Nilson
Attorney, Agent, or Firm—Rhodes and Boller

[57] ABSTRACT

A roll-over vent valve for an automobile fuel tank comprises a novel means for minimizing the force required to re-open a corked shut-off element. The disclosed embodiment comprises a thin, slightly pliable, circular disc for the shut-off element which seats against an annular seat to close the vent passage in the event of roll-over. If the pressure in the tank headspace is sufficiently positive and the disc is closed against the seat in the absence of roll-over, an extra force is required to unseat the disc because of the pressure differential acting on the seated disc. The magnitude of force required to unseat the disc is significantly attenuated in the present invention by having the force act over a limited circumferential extent of the sealing contact of the disc against the seat. This peels the disc from the seat with complete unseating being accomplished by causing the force to act progressively around the perimeter of the disc. In one embodiment the disc is caged by a set of fingers which sequentially act on the disc at different circumferential locations to transmit the re-opening force around the disc. In another embodiment tethered cords of different lengths are used.

27 Claims, 3 Drawing Sheets

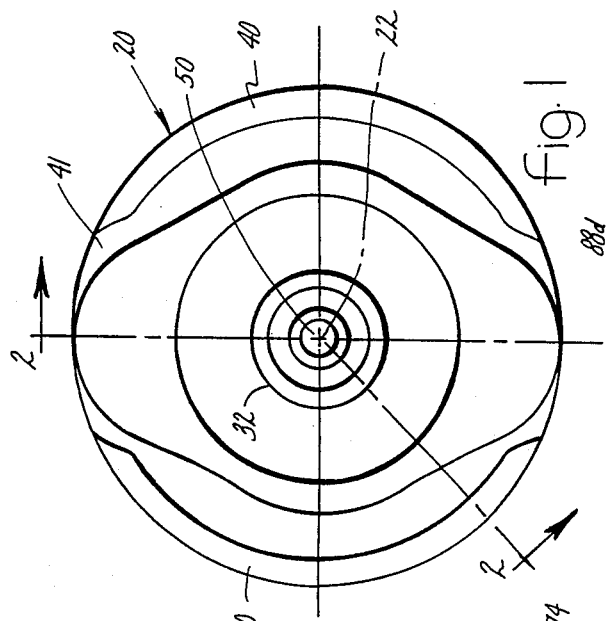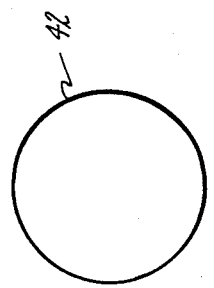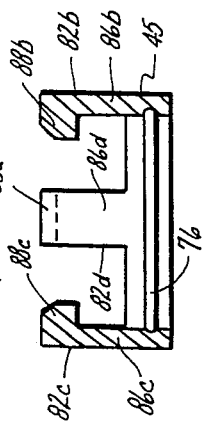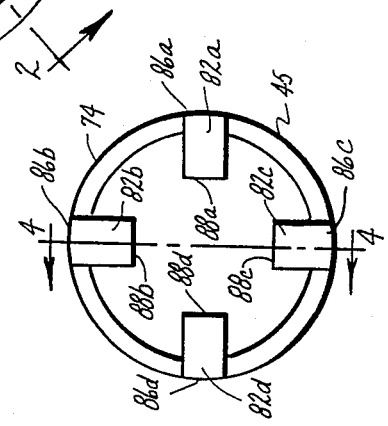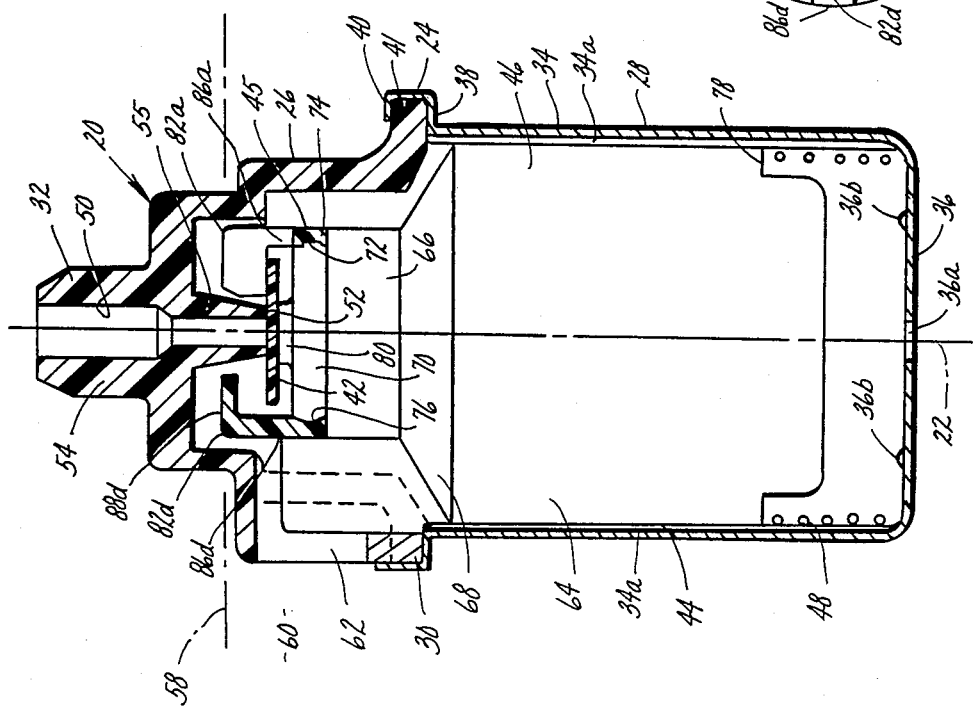

FUEL SYSTEM VENT VALVE HAVING ROLL-OVER CLOSURE WITH IMPROVED RE-OPENING ACTION FOR VENTING

BACKGROUND AND SUMMARY OF THE INVENTION

This invention relates to roll-over valves which are used in the fuel systems of automotive vehicles.

The emission of volatile fuel vapors to atmosphere is considered to be such a significant source of environmental pollution in the United States that laws and government regulations have been imposed on automobile manufacturers to limit the amount of such vapors emitted from automobile fuel systems. Today's automotive vehicles are equipped with evaporative emission control systems whose purpose is to prevent the escape of volatile fuel vapors into the atmosphere.

Ideally, fuel systems of automotive vehicles should be completely closed to prevent vapor escape, but practical operational considerations must be taken into account, and therefore the fuel tank and related parts of the fuel system are not truly completely closed; rather, certain valving functions are associated with them. For example, extremes of heat and cold will affect the pressure in the tank's headspace giving rise to the need for venting and vacuum pressure relief functions for limiting positive and negative tank pressure respectively. Likewise, as fuel from the tank is consumed by the vehicle's engine, air must be introduced into the tank's headspace to limit the magnitude of negative tank pressure. Such venting and vacuum relief functions are performed through valves.

A typical evaporative emission control system in an automotive vehicle comprises a vapor collection canister which is connected to the headspace of the fuel tank by a conduit and which contains a medium capable of adsorbing volatile fuel vapors. When the vapor pressure in the tank's headspace rises above a certain positive level, the tank's headspace is vented to the canister, and vapors flow from the tank into the canister where they are collected. In this way the uncontrolled escape of vapors to atmosphere is avoided, yet the tank is vented as required. Similarly, an increase in the magnitude of negative tank headspace pressure, i.e. vacuum, is relieved by reverse flow into the tank. A combination vent/relief valve mechanism may be included in the conduit between the tank and canister to perform these functions whenever they are required. Under engine operating conditions the canister will be purged by the engine vacuum which will deliver controlled volumes of collected fuel vapors to the engine for combustion.

The various valves associated with the fuel tank, and any other conduits connected to it, may constitute potential sources of liquid fuel leakage in certain automobile accidents, especially roll-over type accidents. Such leakage of liquid fuel could cause even more dire consequences than the roll-over itself. Concern about roll-over-caused fuel leakage is also the subject of regulation, and for compliance, roll-over shut-offs have been incorporated into fuel tank conduits and valves to prevent the escape of liquid fuel in the event of a roll-over type accident.

A roll-over shut-off is normally open but closes in response to a predetermined amount of tipping indicative of vehicle roll-over. The definition of roll-over is not limited to the vehicle becoming completely upside down; it includes a range of lesser extremes. If full roll-over is defined as 180 degrees of inversion from upright, partial roll-overs are defined between this maximum and some lesser selected angle which is chosen in accordance with the particular design considerations. In other words, a roll-over shut-off allows for a certain amount of tipping from vertical, but closes when the allowed amount of tipping is exceeded.

Certain types of roll-over shut-offs also possess the ability to close when immersed in liquid fuel. For example, when a roll-over shut-off of this type exercises control of a tank's vapor vent, not only will it close the vent upon roll-over, but if the liquid fuel rises to the level of the vent in the absence of roll-over, the shut-off will also close the vent line to prevent liquid fuel from passing through the vent.

A roll-over shut-off has a mechanism which is attitude-responsive whereby in response to tipping from a nominal upright position beyond a predetermined permissible amount, the shut-off closes the conduit or valve with which it is associated. The most common form of attitude-responsive mechanism comprises a weight which controls a shut-off element. The weight holds the element open so long as the mechanism is not tipped beyond the permissible amount, but pushes the shut-off element closed against a seat once the mechanism has been tipped into the roll-over range. The amount of tipping required to close the shut-off against the seat is a function of several factors such as the mass, shape, and density of the weight, and any additional active components, such as springs, or caged balls, for example So long as the automotive vehicle is operating in the usual manner over relatively flat terrain, or up and down hills, the roll-over shut-off element is held open by the mechanism, but in the event of a roll-over type accident, the mechanism closes the shut-off element to prevent liquid fuel leakage from the fuel tank via the associated conduit or valve.

Examples of various types of fuel system roll-over valves are shown in a number of U.S. patents. Included among these is Applicant's own U.S. Pat. No. 4,646,772.

Additional concerns about the escape of volatile fuel vapors to the atmosphere has prompted further governmental regulation in the United States addressing the containment of vapor during filling of automobile fuel tanks at service stations. Consequently, additional complexity will have to be introduced into automobiles' evaporative emission control systems and it is possible that multiple roll-over shut-offs, and/or more complex roll-over shut-offs may be required in future vehicles.

While the present invention in its generic aspects is not limited to the particular manner of the roll-over shut-off's use in the fuel system, certain uses, such as in a vent between the tank and the canister of the evaporative emission control system, impose more severe constraints on the shut-off than others, and this is where the advantages of the invention are most appreciated. The invention attains a very significant improvement in those uses where it is important that the force required to re-open a closed shut-off be minimized.

In regular operation of an automotive vehicle having a roll-over shut-off in the vent line to the evaporative emission control system, it may happen that the roll-over shut-off element closes under certain conditions unrelated to and not involving vehicle roll-over. In one example, a roll-over vent valve assembly which is mounted in a sealed manner in an opening in the top wall of the fuel tank may have its interior exposed to the action of liquid fuel in the tank, either fuel slosh within the tank, or some degree of immersion in the fuel due to the fuel level approaching the top of the tank. While the associated mechanism which controls the shut-off element will, per se, seek to keep the shut-off element open so long as the valve attitude remains within the allowable range about nominal upright, the buoyancy of fuel may temporarily override the controlling influence of the mechanism and cause the shut-off element to close.

In the case of momentary fuel splash, such closures should be only temporary, and the mechanism should promptly regain control to re-open the shut-off element so that there are no adverse consequences on tank headspace pressure. However, if the tank headspace is being vented at the time that fuel splash closes the shut-off element, there would exist pressure differential between the tank and canister. This pressure differential acts on the closed shut-off element, adding to the force required to re-open it, and possibly rendering the mechanism alone unable to re-open it. Therefore, certain roll-over shut-offs which close during venting do so with the consequence that a noticeably higher re-opening force must be exerted in order to overcome the additional component of differential pressure force acting on the closed shut-off element, as well as any further component due to friction between the closed shut-off element and the seat against which the shut-off element is closed. At times then, the shut-off element stays closed when it should re-open. This condition is commonly referred to as "corking".

If the shut-off element is to be intentionally closed when the liquid fuel rises to a certain level near the top of the tank, the attitude-responsive mechanism which operates the shut-off element is endowed with a certain characteristic of buoyancy via which closure of the shut-off element is accomplished. When the fuel level acting on the weight subsequently drops below that at which the shut-off element was buoyed closed, the shut-off element should re-open. Conditions, such as pressure differential, acting on the closed shut-off in the direction of closure will add to the re-opening force requirement and corking of the shut-off element may result here too.

One way to minimize the re-opening force requirement is to reduce the size of the opening controlled by the shut-off element so that for a given differential pressure there will be a lesser component of pressure differential force which must be overcome, and likely a lower frictional force component as well. Unfortunately, this reduction in opening size restricts the flow capacity of the conduit between the canister and the fuel tank and may pose a problem with evaporative emission system compliance and/or operation.

An alternative solution is to increase the mass of the weight which acts to open the closed shut-off, but the amount of material and size of the weight will have to be increased in an area where only limited space is available. Accordingly, this alternate solution may not be feasible in many instances.

In certain generic aspects the present invention relates to an improvement in a roll-over vent valve which, for given physical characteristics of the attitude-responsive mechanism acting on the roll-over shut-off element and for given size of opening controlled by the shut-off element, attenuates the force required to re-open the closed shut-off element compared to valves presently in production. Stated another way, a given force acting against a given pressure differential to re-open the closed shut-off, can re-open a larger opening than valves presently in commercial use.

The present invention achieves this result by having the attitude-responsive or liquid level shut-off mechanism act on the closed shut-off element initially along a limited circumferential extent of its perimeter. This causes the re-opening force to be concentrated along a mere fraction of the full circumferential extent of sealing contact of the shut-off element with the seat; the action is like a mechanical advantage or force amplification. The result is a partial unseating of the shut-off element along a limited circumferential segment of the seat. By then continuing the force progressively around the shut-off element, it is finally completely unseated. The opening/closing characteristics are determined by the design of the attitude-responsive or liquid level shut-off mechanism in relation to the shut-off element and seat.

Several embodiments of the invention are disclosed. In one embodiment, the shut-off element is in the form of a thin, somewhat pliable, circular disc which is captured within a multi-fingered retainer attached to a float body. The retainer and float body constitute a weight for controlling the disc. A helical spring exerts a force on the weight in the direction of closure and the combined effects of weight and spring define the characteristics of the attitude-responsive mechanism.

The retainer and float body cooperatively form a circular cylindrical zone of confinement for the disc relative to the seat. The outside diameter (O.D.) of the disc is greater than that of the seat but the diameter of the zone of confinement is slightly larger so that the disc is capable of a limited amount of radial displacement within the confinement zone. The disc is proportioned relative to the seat such that at any degree of radial displacement of the disc within the zone, a portion of the disc is always in full axial confrontation to the seat. Hence, when the disc is intended to be closed against the seat, such closure will be assured. Closure occurs by the weight moving toward the seat.

The fingers are spaced circumferentially around the retainer and extend axially past the edge of the disc. The distal ends of the fingers project radially inwardly to overlie the marginal edge of the disc, and it is via these radially inwardly extending portions of the fingers that re-opening force is imparted to the disc when the weight moves away from the seat. The fingers have differing axial lengths so that the fingers become effective in succession on the disc, sequentially around the disc's perimeter. By making the disc slightly pliable, it both forms a good seal for closure, and is conveniently peeled away from the seat for re-opening.

In another embodiment, one or more points on the edge of the disc are tethered by one or more thin ribbons, or cords, to the weight. These cords perform the same unseating function as the fingers. Hence, when the weight moves away from the seat, the cord, or cords, are tensioned and pulled in succession at different points along the edge of the disc thereby unseating the disc.

Further details, features, and advantages of the invention will be seen in the ensuing detailed description, the accompanying claims, and the drawings. The drawings disclose a preferred embodiment of the invention according to the best mode contemplated at the present time in carrying out the invention.

BRIEF DESCRIPTION OF THE DRAWINGS

FIG. 1 is a top plan view of a first embodiment of valve assembly embodying principles of the present invention.

FIG. 2 is a longitudinal sectional view taken through the valve of FIG. 1 along the line 2—2.

FIG. 3 is a top plan view of one of the component parts of the valve assembly shown by itself.

FIG. 4 is a sectional view taken along line 4—4 in FIG. 3.

FIG. 5 is a top plan view of another of the component parts of the valve assembly shown by itself.

DESCRIPTION OF THE PREFERRED EMBODIMENT

Figure 6:
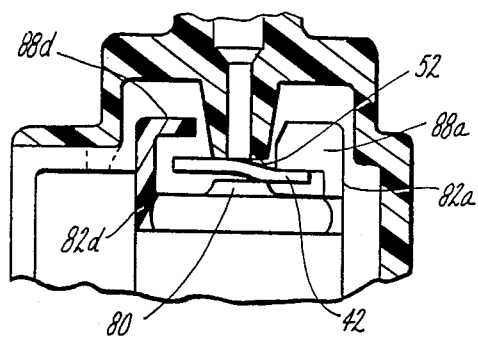
FIGS. 6 and 7 are partial fragmentary views of FIG. 2 illustrating different conditions of valve operation.

FIGS. 1 and 2 illustrate the general organization and arrangement of one presently preferred embodiment of roll-over valve assembly 20 embodying principles of the present invention. Valve assembly 20 has a main longitudinal axis 22 and comprises a valve body 24 consisting of two parts 26 and 28 respectively. The assembly is illustrated in an upright attitude with axis 22 vertical, and the description is based upon this orientation unless the context indicates otherwise.

Part 26 is an injection molded plastic part which comprises a larger diameter lower end 30 and a smaller diameter upper end 32. Part 28 is a metal part, drawn into a generally circular cylindrical shape so as to have a sidewall 34 which is generally parallel to axis 22 and a bottom end wall 36 which is generally transverse to axis 22. Part 28 is also formed with a shoulder 38 adjacent its upper end, and the lower end 30 of part 26 fits with close conformity into the upper end of part 28 against shoulder 38. Part 28 further includes lips 40 which are crimped onto a ledge 41 extending around the lower end 30 of part 28 thereby securing the two parts 26, 28 in assembled relationship to form valve body 24. However, before the two parts 26, 28 are joined to each other in this way, the internal mechanism is assembled into the interior space which is cooperatively defined by the two parts 26, 28.

The internal mechanism comprises a shut-off element 42 in the form of a circular disc, and an attitude and liquid level-responsive operating mechanism, 44 generally, for operating disc 42. Mechanism 44 comprises a retainer 45 which is attached to the upper end of a float body 46, and a helical coil spring 48 for acting axially between the bottom of float body 46 and the bottom end wall 36.

Part 24 comprises a circular passage 50 which is concentric with axis 22. One end of passage 50 is at the upper end 32 of the valve body while the opposite end of the passage is at an annular circular seating surface 52 which is perpendicular to and concentric with axis 22 on the interior of the valve body. Passage 50 is bounded by a cylindrical wall which has an external portion 54 and an internal portion 55. Portion 54 forms an external nipple for reception of a conduit (not shown) via which the valve assembly connects to an evaporative emission control system (not shown). The internal portion 55 extends downwardly a short way to terminate in seating surface 52.

Valve assembly 20 is adapted to be mounted on an automobile fuel tank (not shown) in the same manner described in Applicant's referenced application patent application, or in any other appropriate manner. In a sealed mounting in an opening in the top wall of a fuel tank, most of the valve assembly 20 will be disposed within the tank's headspace and nipple 54 will project upwardly from the fuel tank so that one end of the conduit of the associated evaporative emission control system can be fitted onto it.

The imaginary line portrayed by the reference numeral 58 approximately represents the top wall of the fuel tank. Communication of the tank headspace 60 to the interior of valve body 24 is accomplished by providing two apertures 62 in diametrically opposite sides of part 26. The apertures have limited circumferential extents and therefore except for them, the interior of the valve body is enclosed from the side.

Float body 46 is a one-piece molded plastic part which comprises a larger diameter circular cylindrical lower section 64 which fits fairly closely within sidewall 34, and a smaller diameter circular cylindrical upper section 66 which integrally joins with section 64 through a frusto-conically tapered section 68. The upper end of the smaller diameter section 66 comprises a circular hub 70 having a peripheral bead 72 extending around the outside circular wall.

Retainer 45 has a circular annular base 74 containing an internal circular groove 76, which is complementary to bead 72. The two parts 45 and 46 are assembled together by the snap-fitting of base 74 onto hub 70 with bead 72 snap-fitting into groove 76 to accomplish the retention. Thus the retainer and float body constitute a mass which will act on disc 42 in a manner to be described in greater detail herein.

The inner end of float body 46 which confronts bottom end wall 36 comprises a downwardly facing circular shoulder 78 against which the upper end of spring 48 bears. Spring 48 serves to lightly urge the float body upwardly so that the force of the spring opposes the axial component of gravity acting on the retainer/float body combination. Hence, the operating characteristics of the mechanism 44 are in larger part a function of the retainer/float body design and the particular spring selected. This will be more fully developed in the ensuing description. The sidewall 34 has circumferentially spaced apart axially extending ribs 34a for closer guidance of the axial travel of the float body. The spaces between the ribs provide a drain path for any fuel which may intrude via apertures 62. The bottom end wall 36 contains perforations 36a through which the draining fuel can pass back into the tank. It also contains internal projections 36b which are abutted by the bottom end of the float body at the extreme limit of compression of spring 48. The ribs 34a serve to minimize the amount of contact between the float and the valve body for axial float displacement, and the projections 36b do the same for bottoming out of the float body. In this way, any effects of liquid surface tension between the float body and part 28 are minimized.

The upper end face of hub 70 includes a smaller circular tip 80 which is concentric with axis 22 and has a diameter slightly larger than the O.D. of seat 52. It is the flat upper face of tip 80 which engages the lower face of disc 42 to push the disc upwardly against seat 52. In the particular operating condition portrayed by FIG. 2, the valve disc is being held against seat 52 to block passage 50.

Retainer 45 comprises a set 82 of four fingers 82a, 82b, 82c, 82d which cooperate with the float body to cage disc 42. These fingers are used to unseat the disc in a manner which will also be subsequently described in detail.

Each finger has an axial part 86a, 86b, 86c, 86d which extends from base 74 past the edge of disc 42. The distal end of each finger has a radially inwardly directed part 88a, 88b, 88c, 88d which radially overlaps the disc's edge. While the amount of each inwardly directed part's overlap will depend upon the particular radial position of the disc, there will always be some overlap.

The axial dimension of each finger differs. In the illustrated embodiment with four fingers at 90° C. intervals around the retainer, the axial distance between parts 88a, 88b, 88c, 88d of consecutive fingers and tip 80 increases progressively from the three o'clock position to the nine o'clock position as viewed in FIG. 3. The shortest finger 82a appears in FIG. 2 with the axial distance between the end of tip 80 and the bottom of portion 88a just slightly greater than the thickness of disc 42.

In the natural upright free condition of the valve assembly, per se, apart from the fuel tank, the combined weight of retainer 45 and float body 46 will compress spring 48 to a certain extent and the caged disc 42 will be unseated from seat 52, thereby opening passage 50 to flow. Tendency toward this open condition is retained when the valve assembly is mounted on the fuel tank so that the path from the tank headspace to the evaporative emission canister tends to be open. Conditions encountered in actual operation will at times override this tendency and cause disc 42 to close against seat 52, thereby blocking flow through passage 50. The valve assembly will be further described in detail with reference to various conditions of operation when in use on an automobile vehicle.

First, if the vehicle should experience a roll-over, the valve assembly will be tipped a corresponding amount from the vertical upright position, and mechanism 44 will force disc 42 closed against seat 52 so that fuel will not leak out through the valve assembly provided that the assembly's mount on the tank remains in tact. If the vehicle tilt is less than 45° C. from vertical and the float 46 is not immersed in the fuel, but the disc 42 is closed against seat 52 for any reason, the combined weight of the retainer and float body less the smaller upward spring force will exert a net downward force on the disc seeking to unseat it. While the hub tip 80 and fingers 82 coact to axially and radially cage the disc, the net downward force is transmitted to the disc initially only by part 88a of finger 82a. Therefore, the initial re-opening force on the disc is applied only along a limited extent of the full 360° C. of circular contact of the disc with the seat. The result is that a larger pressure is applied to a fraction of the area of contact between the disc and seat, and this serves to initially crack the disc open along the short extent of the edge where the force is concentrated. Because of the slightly pliable nature of the material of the disc, the disc is in effect peeled away from the seat. (see FIG. 6)

Figure 7:
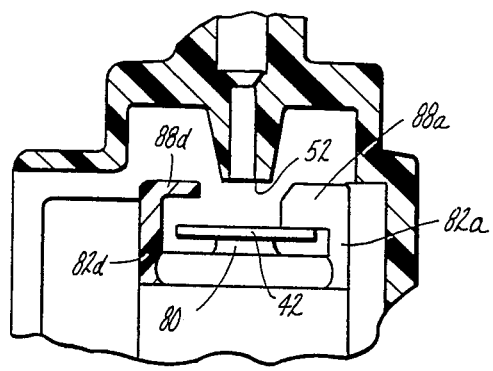

As the peeling continues, the retainer and float body continue moving away from the seat and the next shortest fingers 82b, 82c begin to act on the disc at 90° C. from the point of action of finger 82a. Fingers 82b, 82c continue the peeling away process, and finger 82d finally begins to act as the retainer and float continue to move away from the seat to complete the peeling process with the result that the disc is completely unseated. (see FIG. 7)

The present invention achieves a significant improvement in a roll-over valve because of its lower force requirement to re-open the closed shut-off during operational conditions where one or more additional forces, such as a pressure differential force, are acting to maintain the shut-off element closed.

The opening force will act on the disc initially at only one point. As successive fingers come into action, the force will be shared with them as well, but once a segment of the disc has been peeled away from the seat, a greater proportion of the shared force may be reacted by the particular finger which is acting to peel away the corresponding portion of the disc from the seat so that a very effective opening action is consequently achieved.

The significance of this action can be appreciated as a solution to what is commonly known as "corking" which has been experienced with other types of valves. Heretofore, corking problems have been addressed by compromising one set of parameters against another. A much smaller degree of compromise, if indeed any at all, is required with the present invention.

Figure 8:
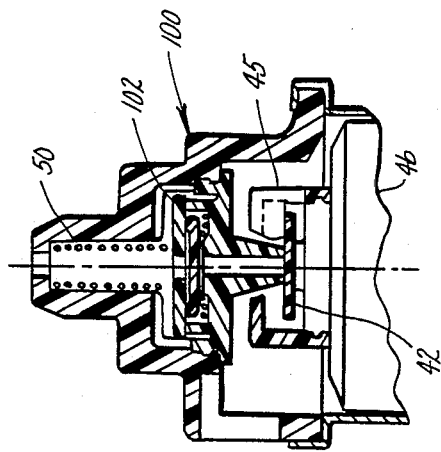
FIG. 8 is a partial fragmentary sectional view illustrating principles of the invention in another embodiment of valve assembly.

An alternate embodiment 100 which incorporates both vacuum relief and vent valve functions is illustrated in FIG. 8. It is basically the same as the valve of FIGS. 1 and 2 except that, included in the passage 50 between seat 52 and nipple 54, is a combination relief and vent valve mechanism 102 which, while the disc 42 is unseated from seat 52, opens passage 50 to flow for venting of the tank headspace only when the headspace pressure exceeds a predetermined setting and alleviates tank vacuum by opening the passage to reverse flow only when the vacuum level in the tank exceeds a certain level. Details of these valves and their functions are known in the art and need not be described in detail here.

Although a four-fingered retainer has been described, other retainers having a different number of fingers are contemplated. One example is a three-fingered version having the fingers 120° C. apart and of different lengths.

Figure 9:
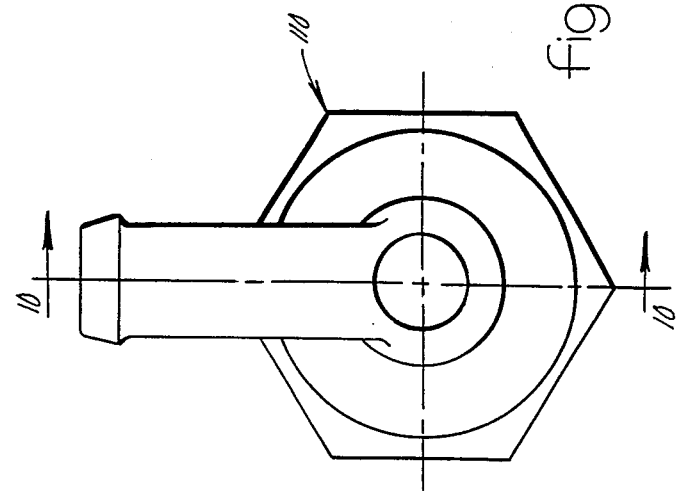
FIG. 9 is a top plan view of a further embodiment of valve assembly embodying principles of the invention.
Figure 10:
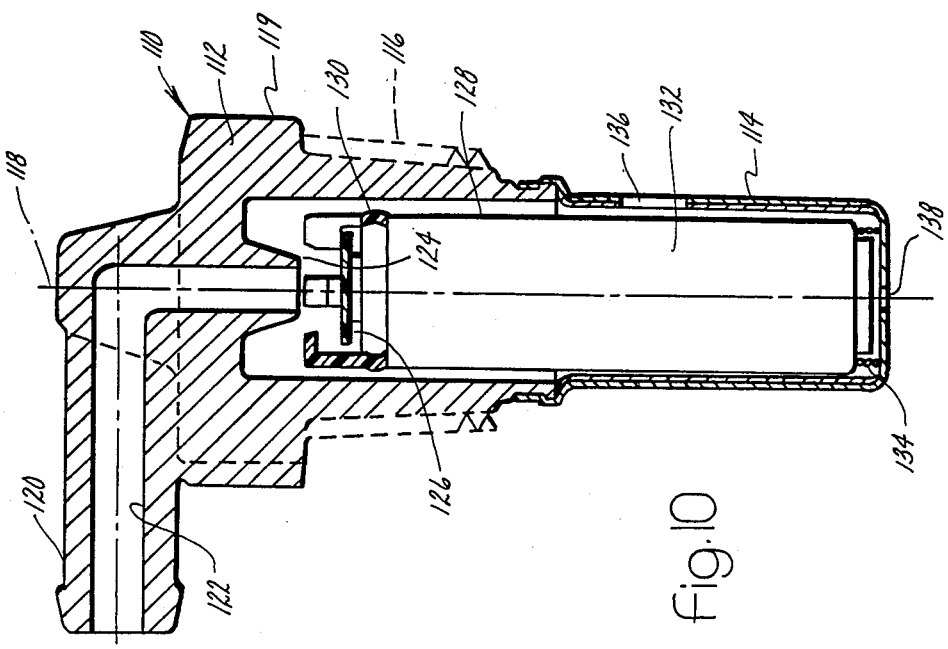
FIG. 10 is a longitudinal sectional view taken in the direction of line 10—10 in FIG. 9.

FIGS. 9 and 10 portray a further embodiment 110 of valve assembly embodying principles of the invention. The valve body comprises an upper body part 112 and a lower body part 114.

Part 112 is a die cast or plastic fitting having an external thread 116 concentric with the valve's main axis 118 and via which the valve assembly threads into a threaded opening in the top wall of a fuel tank (not shown) by use of a tool (not shown) applied to a wrenching surface 119. Part 112 has an external nipple 120 extending at a right angle to axis 118 and this nipple is adapted to receive a conduit (not shown). A passageway 122 extends through the body from the end of nipple 120 to a circular downwardly facing seat 124. Hence, the nipple 120, the passage 122 and the seat 124 correspond to the nipple 54, the passage 50, and the seat 52 in assembly 20.

The upper end of lower part 114 is attached to the lower end of part 112 and the two cooperatively define a generally circular cylindrical interior space within which is disposed a disc 126 and an operating mechanism 128. The disc 126 and the operating mechanism 128 correspond respectively to the disc 42 and the operating mechanism 44 in valve assembly 20. The component parts of operating mechanism 128 include a retainer 130, a float body 132, and a spring 134 which are analogous to the corresponding parts 45, 46, and 48 in valve assembly 20.

FIG. 10 shows disc 126 unseated from seat 124 and resting on the tip at the upper end of the float body. Communication of the tank headspace to a conduit fitted onto nipple 120 is via one or more vent holes 136 in the sidewall of part 124, through the annular space surrounding the float inside of the valve assembly, and, thence through passage 122. As in valve assembly 20, there are also one or more drain holes 138 in the lower end wall.

The drawing figure illustrates the nominal upright free condition of the valve assembly. One especially noticeable difference between valve assembly 20 and valve assembly 110 is that the openings 136 in assembly 110 are located much lower in the sidewall than are the openings 62 in valve assembly 20. This is done for a purpose.

The tank is nominally vented via the valve assembly and the conduit connected to it. However, once the fuel level rises to a point where the openings in the sidewall 136 are below the surface of the fuel as a result of vehicle tilt, roll-over or fuel slosh, the fuel will rise rapidly within the interior of the valve body because the shut-off is still open. The suddenly rising level of fuel immediately acts on the operating mechanism which responds by quickly moving upwardly and urging the disc 126 closed against seat 124. This automatically closes the vent. The design is such that the disc is forced closed before the liquid fuel level rises to a point where liquid fuel passes through passage 122. The action of the retaining fingers in subsequently re-opening the disc when the fuel level drops is like that in valve assembly 20.

Figure 11:
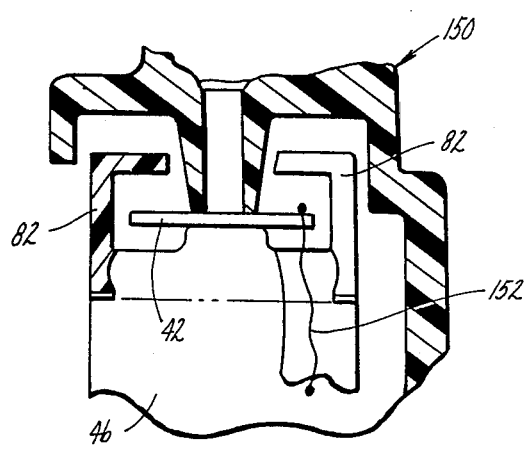
FIG. 11 is a partial fragmentary sectional view illustrating still another embodiment of valve assembly according to the present invention.
Figure 12:
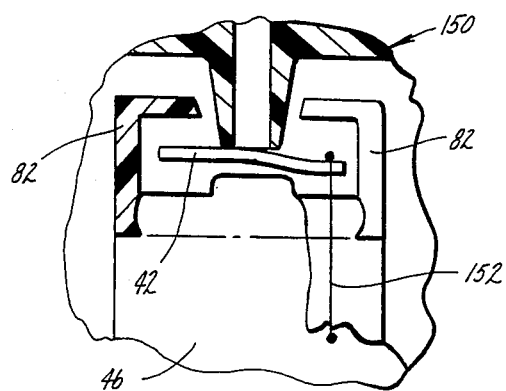
FIG. 12 is a view similar to FIG. 11 illustrating a different condition of valve operation.

FIGS. 11 and 12 illustrate a still further valve embodiment 150 which is in essence like valve assembly 20 except in details of the operative connection between the operating mechanism and the disc 42. In this embodiment the fingers 82 serve to cage disc 42, but all fingers are the same axial length and the spacing distance between the face of hub tip 80 and the radially inwardly directed distal ends of the fingers is considerably greater than the disc's thickness. The re-opening action on the closed disc is by a set of one or more thin ribbons, or cords, 152 which are tethered between the float body and the marginal edge of the disc. Where multiple cords are used, they are made of slightly differing lengths, and their points of connection are circumferentially spaced apart. The lengths are such that as the operating mechanism moves away from the seat, the shortest cord is the first one to become tensioned, analogous to the action of the shortest finger 82a on the valve disc in valve 20. The downward opening force is concentrated at the point at which that cord attaches to the disc, and this produces a peeling effect in the same manner as the finger 84a did in valve 20. A continued downward displacement causes the next shortest cord to become tensioned, and the re-opening force is now transmitted to the cord's point of connection to the disc, analogous to the action of the next shortest finger on the disc in valve assembly 20. Hence, the peeling action is continued around the perimeter of the disc in the same manner as in valve assembly 20.

The particular manner in which the disc is re-opened will be a function of the number of cords used, and it is contemplated that even a single cord could be used, provided that the disc is otherwise appropriately constrained so that consistent opening and closing action would be assured. For example, in the illustrated embodiment, a single cord could perform the initial peeling, followed by the action of various fingers to complete the peeling process.

While the combined mass/spring characteristics will be the principal consideration in producing the desired shut-off closure and opening points, the degree in buoyancy in fuel of the component parts of mechanism 44 can also be a consideration in the design. The degree of buoyancy of the full mechanism is a function of the spring characteristics and the specific gravity of the float body/retainer combination in the fluid being controlled, i.e. fuel. Depending on the amount of fuel in the tank and the location and nominal orientation of the valve assembly on the tank, the valve assembly may become partially or even fully immersed in liquid fuel in a roll-over accident. This will influence to a greater or lesser degree the shut-off versus tipping characteristic of the valve assembly and the automobile manufacturer may want to take this into account in specifying the needed valve characteristics. It is appropriate for the shut-off to be buoyed closed if the level of fuel rises too high in the tank during regular, non-roll-over conditions. The particular sizes and shapes of the various parts in any embodiment of valve assembly embodying principles of the invention are designed in accordance with conventional engineering practices to achieve the specified operating characteristics. In the disclosed embodiments the re-opening force which initiates the re-opening is applied in a radially outwardly spaced relation to the O.D. of the seat. The precise point of application in any particular design will be a function of certain parameters, such as available re-opening force magnitude and physical characteristics of the disc.

Because of the corrosive and volatile nature of the fuel, the component parts of the valve assemblies should be fabricated from appropriate materials. A suitable material for valve disc 42 is polyester reinforced fluorosilicone, 60 durometer. The float body 46 may be fabricated from Celcon and the retainer 45 from Celcon. The valve body part 24 can also be fabricated from Celcon.

While a preferred embodiment has been described, principles of the invention are applicable to other embodiments.

What is claimed is:

1. A roll-over valve comprising a valve body having an axis adapted to be disposed in a nominally upright attitude, said valve body having an inlet adapted to be communicated to the headspace of a tank for a volatile combustible liquid, such as gasoline or diesel fuel, and an outlet adapted to be communicated to a point which is external to the headspace of the tank, a pasasge through which flow between said inlet and said outlet is constrained to pass, an attitude and fuel level-responsive mechanism for selectively opening and closing said passage in accordance with the actual attitude of the roll-over valve body relative to nominal upright and with fuel level, said mechanism comprising a shut-off element which is movable into and out of sealing contact with an annular seat formed in said valve body and extending around said axis for opening and closing said passage, and gravity-responsive means which acts to keep the shut-off element unseated from said seat when the actual attitude of the valve body is within a certain limited range of attitudes about and including nominal upright and the fuel level is below a certain level, but which moves the shut-off element against the seat to close the passage when the actual attitude of the valve is outside said limited range or the fuel level is above said certain level, said gravity-responsive means comprising means which, in response to conditions of attitude and fuel level that are conducive to movement of said gravity-responsive means in a direction for unseating said shut-off element from said seat while the shut-off element is disposed against said seat and forced against said seat by a certain vapor pressure differential, applies to said shut-off element an unseating force which is concentrated along a limited circumferential segment of the full extent of circumferential sealing contact of the disc with the seat, which is due to the net effect of gravity along acting on said gravity-responsive means, and which is sufficient by itself to displace said shut-off element from sealing contact with said seat.

2. A roll-over valve as set forth in claim 1 in which said shut-off element is constructed and arranged relative to said seat so as to have a portion which is disposed radially outwardly beyond said seat, and said means which applies an unseating force to said shut-off element applies that force to said portion of said shut-off element.

3. A roll-over valve as set forth in claim 2 in which said shut-off element is a thin, slightly pliable, disc, and said means which applies an unseating force to said shut-off element acts on said disc in a manner which results in the disc being peeled away from the seat.

4. A roll-over valve as set forth in claim 3 in which said disc has a flat surface which confronts said seat for sealing contact therewith when closing said passage, and said means which applies an unseating force to said shut-off element acts on said disc against a portion of said flat surface which is spaced radially outwardly beyond said seat.

5. A roll-over valve as set forth in claim 4 in which said gravity-responsive means comprises a weight, and said means which applies an unseating force to said shut-off element comprises a finger having an axially extending portion which extends axially from said weight past said disc in radially outwardly spaced relation thereto and a radially inwardly directed distal portion which radially overlies the disc, said radially inwardly directed distal portion acting against said portion of said flat surface.

6. A roll-over valve as set forth in claim 5 in which said means which applies an unseating force to said shut-off element comprises plural such fingers of different axial lengths and circumferentially spaced apart to act along different circumferential segments of the disc.

7. A roll-over valve as set forth in claim 6 in which such fingers are at least three in number arranged in a uniform circumferential pattern.

8. A roll-over valve as set forth in claim 7 in which said fingers are part of a retainer piece which, in cooperation with said weight, define a zone of confinement which radially and axially captures the disc.

9. A roll-over valve as set forth in claim 8 in which the weight comprises a flat tipped end which confronts and engages a central region of the disc on a surface of the disc opposite said first-mentioned surface.

10. A roll-over valve as set forth in claim 9 in which said central region of said disc that is engaged by said flat tipped end has an area greater than the area bounded by said annular seat, and said central region of said disc and said flat tipped end are substantially aligned with said seat such that when said gravity-responsive means moves said shut-off element against said seat to close said passage, an annular portion of said central region is pressed directly between a corresponding annular portion of said flat tipped end and said seat.

11. A roll-over valve as set forth in claim 3 in which said disc has a flat surface which confronts said seat for sealing contact therewith when closing said passage, and said means which applies an unseating force to said shut-off element comprises a cord which acts on said disc in radially outwardly spaced relation to said seat.

12. A roll-over valve as set forth in claim 11 in which said gravity responsive means comprises a weight and said cord is tethered between said disc and said weight.

13. A roll-over valve as set forth in claim 12 in which said means which applies an unseating force to said shut-off element comprises plural such cords tethered between said disc and said weight, said plural tethered cords being of different lengths and acting at different circumferential locations on the disc.

14. A roll-over valve as set forth in claim 12 in which said cord is integral with one of said weight and disc.

15. A roll-over valve as set forth in claim 11 in which said weight includes one or more axial fingers which coact to cage the disc within a defined zone of axial and radial confinement.

16. A roll-over valve comprising a valve body having an axis adapted to be disposed in a nominally upright attitude, said valve body having an inlet adpated to be communicated to the headspace of a tank for a volatile combustible liquid, such as gasoline or diesel fuel, and an outlet adapted to be communicated to a point which is external to the headspace of the tank, a passage through which flow between said inlet and said outlet is constrained to pass, an attitude and fuel level-responsive mechanism for selectively opening and closing said passage in accordance with the actual attitude of the roll-over valve body relative to nominal upright and with fuel level, said mechanism comprising a shut-off element which is moveable into and out of sealing contact with an annular seat formed in said valve body and extending around said axis for opening and closing said passage, said element comprising a pliable perimerter which makes the sealing contact with said seat, and gravity-responsive means which acts to keep the shut-off element unseated from said seat when the actual attitude of the valve body is within a certain limited range of attitudes about and including nominal upright and the fuel level is below a certain level, but which moves the shut-off element against the seat to close the passage when the actual attitude of the valve is outside said limited range or the fuel level is above said certain level, said gravity-responsive means comprising means which, in response to conditions of attitude and fuel level that are conducive to movement of said gravity-responsive means in a direction for unseating said shut-off element from said seat while the shut-off element is disposed against said seat and forced against said seat by a certain vapor pressure differential, applies to said shut-off element an unseating force which acts to peel the pliable perimeter of said shut-off element from said seat, which is due to the net effect of gravity alone acting on said gravity-responsive means, and which is sufficient by itself to peel said shut-off element from said seat.

17. A roll-over valve as set forth in claim 16 in which said shut-off element is a thin round disc.

18. A roll-over valve as set forth in claim 16 in which said shut-off element is constructed and arranged relative to said seat so as to have a portion of its perimeter disposed radially outwardly beyond said seat, and said means which applies an unseating force to said shut-off element applies that force to said portion of said shut-off element.

19. A roll-over valve as set forth in claim 18 in which said shut-off element is a thin round disc which has a flat surface which confronts said seat for sealing contact therewith when closing said passage, and said means which applies an unseating force to said shut-off element acts on said disc against a portion of said flat surface which is spaced radially outwardly beyond said seat.

20. A roll-over valve as set forth in claim 19 in which said gravity-responsive means comprises a weight, and said means which applies an unseating force to said disc comprises a finger having a axially extending portion which extends axially from said weight past said disc in radially outwardly spaced relation thereto and a radially inwardly directed distal portion which radially overlies the disc, said radially inwardly directed distal portion acting against said portion of said flat surface.

21. A roll-over valve as set forth in claim 20 in which said means which applies an unseating force to said disc comprises plural such fingers, each of different axial length and circumferentially spaced apart to act along different circumferential segments of the disc.

22. A roll-over valve as set forth in claim 18 in which said gravity-responsive means comprises a weight and said means which applies an unseating force to said shut-off element comprises a cord which is connected to said weight and acts on said disc in radially outwardly spaced relation to said seat.

23. A roll-over valve as set forth in claim 22 in which said means means which applies an unseating force to said shut-off element comprises plural such cords tethered between said disc and said weight, said plural tethered cords being of different lengths and acting at different circumferential locations o the disc.

24. A roll-over valve as set forth in claim 22 in which said weight includes one or more axial fingers which coact to cage the disc within a defined zone of axial and radial confinement.

25. A roll-over valve comprising a valve body having an axis adapted to be disposed in a nominally upright attitude, said valve body having an inlet adapted to be communicated to the headspace of a tank for a volatile combustible liquid, such as gasoline or diesel fuel, and an outlet adapted to be communicated to a point which is external to the headspace of the tank, a passage through which flow between said inlet and said outlet is constrained to pass, an attitude and fuel level-responsive mechanism for selectively opening and closing said passage in accordance with the actual attitude of the roll-over valve body relative to nominal upright and with fuel level, said mechanism comprising a disc which is moveable into and out of sealing contact with an annular seat formed in said valve body and extending around said axis for opening and closing said passage, and gravity-responsive means which acts to keep the disc unseated from said seat when the actual attitude of the valve body is within a certain limited range of attitudes about and including nominal upright and the fuel level is below a certain level, but which moves the disc against the seat to close the passage when the actual attitude of the valve is outside said limited range or the fuel level is above said certain level, said gravity-responsive means comprising a mass that moves toward and away from said seat in accordance with attitude and fuel level conditions and a cage structure for caging said disc on said mass, said cage structure comprising a base structure fitting to said mass, a side structure that projects from said base structure toward said seat in circumferentially bounding and spaced relation to said disc, and an end structure that is spaced from said base structure and projects from said side structure in radially overlapping relation to the circumferential margin of said disc while leaving a central region of the disc free for seating on said seat, said base structure containing an opening for fitting to said mass that is larger than said disc, and in which said base structure and said mass comprise snap-fit means for fitting of the two together.

26. A roll-over valve as set forth in claim 1 in which said means which applies an unseating force to said shut-off element comprises a cord which acts on said shut-off element in radially outwardly spaced relation to said seat.

27. A roll-over valve as set forth in claim 26 in which said means which applies an unseating force to said shut-off element comprises plural such cords of different lengths acting at different circumferential locations on said shut-off element.

* * * * *

UNITED STATES PATENT AND TRADEMARK OFFICE
CERTIFICATE OF CORRECTION

PATENT NO. : 4,753,262
DATED : June 28, 1988
INVENTOR(S) : Rudolph Bergsma

It is certified that error appears in the above-identified patent and that said Letters Patent are hereby corrected as shown below:

```
Column 7, line 24, "C." should be deleted
Column 7, line 54, "C." should be deleted
Column 7, line 64, "C." should be deleted
Column 8, line 6,  "C." should be deleted
Column 8, line 53, "C." should be deleted
Column 10, line 63 "pasasge" should read --passage--;
Column 11, line 24 "along" should read --alone--;
Column 12, line 38 "adpated" should read --adapted--;
Column 12, line 64 "conductive" should read
--conducive--;
Column 13, line 49 "o" should read --on--.
```

Signed and Sealed this

Eighth Day of November, 1988

*Attest:*

DONALD J. QUIGG

*Attesting Officer*    *Commissioner of Patents and Trademarks*